E. J. HUNT & W. T. GIDDEN.

PROCESS FOR THE ELECTROLYSIS AND TREATMENT OF SULFATE LIQUORS.

APPLICATION FILED SEPT. 21, 1917.

Reissued Feb. 26, 1918. 14,436.

Inventor:
E. J. Hunt and
W. T. Gidden.
By their Attorneys:
Baldwin & Wight

UNITED STATES PATENT OFFICE.

EDWIN JAMES HUNT, OF OLDBURY, AND WILLIAM THOMAS GIDDEN, OF WARLEY, ENGLAND, ASSIGNORS TO CHANCE & HUNT, LIMITED, OF OLDBURY, ENGLAND.

PROCESS FOR THE ELECTROLYSIS AND TREATMENT OF SULFATE LIQUORS.

14,436. Specification of Reissued Letters Patent. Reissued Feb. 26, 1918.

Original No. 1,107,309, dated August 18, 1914, Serial No. 826,196, filed March 21, 1914. Application for reissue filed September 21, 1917. Serial No. 192,622.

*To all whom it may concern:*

Be it known that we, EDWIN JAMES HUNT and WILLIAM THOMAS GIDDEN, subjects of the King of Great Britain, and residing, respectively, at the Chemical Works, Oldbury, England, and Abbey Road, Warley, Worcestershire, England, have invented an Improved Process for the Electrolysis and Treatment of Sulfate Liquors, of which the following is a specification.

The present invention relates to improvements in the electrolysis of solutions of metal sulfates, and while of general applicability is particularly suitable in the case of acid solutions of zinc sulfate and of sulfates of other metals.

Figure 1:
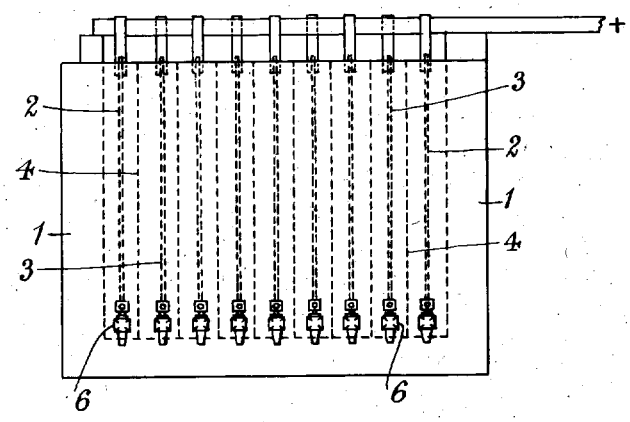
Figure 2:
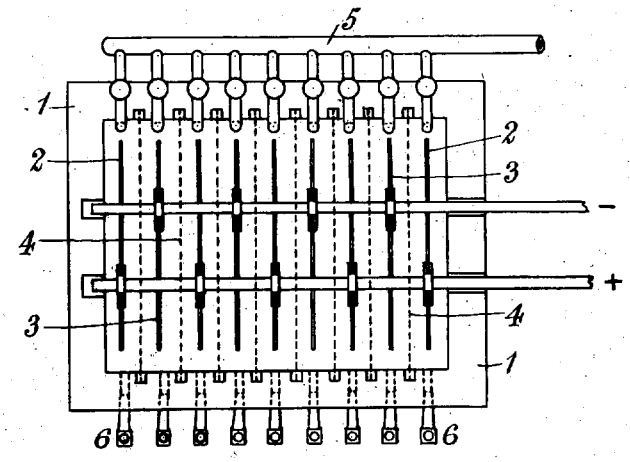

The accompanying drawings which are more or less diagrammatic, show a cell embodying our improvements. In said drawings, Figure 1 shows an elevation of the cell, and Fig. 2 a top plan thereof.

In the annexed drawings, 1 is the cell, 2 are lead anodes, 3 cathodes of sheet zinc or other suitable metal, 4 are porous diaphragms of asbestos cloth adapted to permit free circulation of the liquor, 5 is a supply pipe at the top of the cell for the supply of electrolyte, and 6 are run off taps at the bottom of the cell. In the electrolysis of sulfate solutions, especially sulfate of zinc, it has been found that when lead anodes are employed, lead is deposited at the cathode together with the zinc for example, thus considerably reducing the purity and value of the zinc.

It has always been supposed that the lead found in the deposited metal at the cathode was derived from lead transported in solution in the electrolyte and many attempts have been made to manufacture insoluble anodes of substances other than metallic lead.

We have discovered that the main source of the lead impurity is not lead transported in solution from anode to cathode, but is found in solid particles of lead peroxid detached from the anode and of solid lead sulfate formed in the neighborhood of the anode which passing undissolved into the electrolyte are deposited as lead at the cathode.

Although the use of diaphragms in certain classes of electrolytic apparatus, has been known for years it is at present universally accepted that lead anodes cannot be employed for electrolyzing sulfate of zinc solutions with success. We are however able to do this owing to our discovery that the main source of lead impurity consists of solid and not dissolved lead compound.

According to this invention in the electrolysis of sulfate of zinc-solution containing free sulfuric acid with vertical lead anodes such free particles of undissolved lead compounds are prevented from contaminating the metal depositing at the vertical cathode by preventing their access to the cathode and for this purpose a porous diaphragm may be interposed between the electrodes or the anodes or the cathodes may be surrounded with porous material.

The function of the diaphragm or porous material which may conveniently consist of asbestos cloth is to prevent insoluble lead compounds formed at the anodes from reaching the cathodes but the diaphragm should be sufficiently porous to permit of as free circulation as possible of the liquor so that the electrolyte is substantially the same at the anode and cathode.

In working, if it be found that at any moment the diaphragm is materially hindering the presence of free sulfuric acid at the cathode, free acid may be added and this may be derived from the anode sections of the cell after separation of the suspended lead compounds. In any case acid liquor may be continuously or intermittently withdrawn from either the anode sections, the cathode sections, or both, and the electrolyte should be kept in free movement either by circulation of liquor or by mechanical agitation.

We may add that we are aware that when electrolyzing a solution of sulfate of zinc and even when a lead anode has been employed, it is not in itself new to use a diaphragm. Previously however the diaphragm was employed to separate two liquors of different compositions at the two electrodes or to permit different reactions in the solutions at the electrodes while preventing mutual interference. By our invention, however, a new result is obtained, viz., in the electrolysis of an acid solution of sulfate of zinc present at both anode and cathode, a deposit of zinc so pure in spite of the use of lead anodes that a large percentage of free sulfuric acid may be present at the cathode without redissolving the deposited zinc.

Acid liquor drawn off from the cell and free from suspended lead compounds is employed to treat crude oxid or carbonate of zinc. After separation from the excess of zinc oxid or carbonate the neutral or slightly basic solution is then treated to free it from any iron and maganese which may remain in after treatment with the zinc oxid. For this purpose the solution is agitated with a quantity of the lead peroxid (dependent on the quantity of ferrous iron or manganese present) formed by oxidation of the lead anodes during electrolysis, and obtained by separation from liquor in the anode compartment. The liquor from the anode sections may be employed directly, without removal of suspended solid matter, for neutralization by agitation with crude zinc oxid or carbonate in which case the suspended peroxid will cause partial or complete separation of the iron and manganese according to its amount, but we preferably proceed as above described. This treatment takes place preferably under the influence of heat; an alkali or a metallic oxid such as zinc oxid, or a carbonate such as carbonate of lime or zinc may be added to complete the separation.

In all cases liquors so purified may be further purified by treatment with metallic zinc or zinc dust to fit them for electrolysis.

What we claim is:

1. In a process for the electrolysis of a zinc sulfate solution containing free sulfuric acid by the aid of a lead anode so conducting the process that free particles of undissolved lead compounds derived from the anode cannot pass to the cathode while the electrolyte at both anode and cathode remains the same.

2. In a process for the electrolysis of a zinc sulfate solution containing free sulfuric acid the combination with a vertical lead anode of means adapted to prevent solid free particles of undissolved lead compounds derived from the anode from passing to the cathode while allowing the free passage of the electrolyte.

3. In a process for the electrolysis of a zinc sulfate solution containing free sulfuric acid by the aid of a lead anode so conducting the process that free particles of undissolved lead compounds derived from the anode cannot pass to the cathode while the electrolyte at both anode and cathode remains the same and utilizing the peroxid of lead so obtained to fit zinc sulfate liquors for electrolysis.

4. In a process for the electrolysis of a zinc sulfate solution containing free sulfuric acid the combination with a vertical lead anode of means adapted to prevent solid free particles of undissolved lead compounds derived from the anode from passing to the cathode while allowing the free passage of the electrolyte and utilizing the peroxid of lead so obtained to fit zinc sulfate liquors for electrolysis.

5. In the electrolysis of acid solutions of metal sulfate, the herein described improvement which comprises passing a current of electricity from a lead anode through an electrolyte comprising an acid solution of a metal sulfate to a cathode, and preventing contamination of the liquor surrounding the cathode with lead compounds, by separating the anode compartment from the cathode compartment by a medium through which the solution can readily pass, but which is capable of preventing the passage of insoluble lead compounds.

6. In the electrolysis of acid solutions of zinc sulfate, the herein described improvement which comprises passing a current of electricity from a lead anode through an electrolyte comprising an acid solution of zinc sulfate to a cathode, and preventing contamination of the liquor surrounding the cathode with lead compounds, by separating the anode compartment from the cathode compartment by a medium through which the solution can readily pass, but which is capable of preventing the passage of insoluble lead compounds.

7. In the electrometallurgy of metals, the herein described improvement which comprises electrolyzing a solution of a metal sulfate in a cell having separate anode and cathode compartments, while employing a lead anode; treating crude acid-soluble metalliferous material with the spent electrolyte, to produce a substantially non-acid solution containing metal sulfate in solution; treating the resulting solution with lead oxid derived from the anode compartment of the electrolytic cells, to precipitate iron and similar metals, and thereafter repeating the cycle of operations.

In witness we have hereunto signed our names in the presence of two witnesses, at Oldbury, England, this 4th day of December, 1917.

EDWIN JAMES HUNT.
WILLIAM THOMAS GIDDEN.

Witnesses:
GEORGE ANDERSON COTTRELL,
REGINALD WILLIAM SALLIS.